UNITED STATES PATENT OFFICE 2,778,342
Patented Jan. 22, 1957

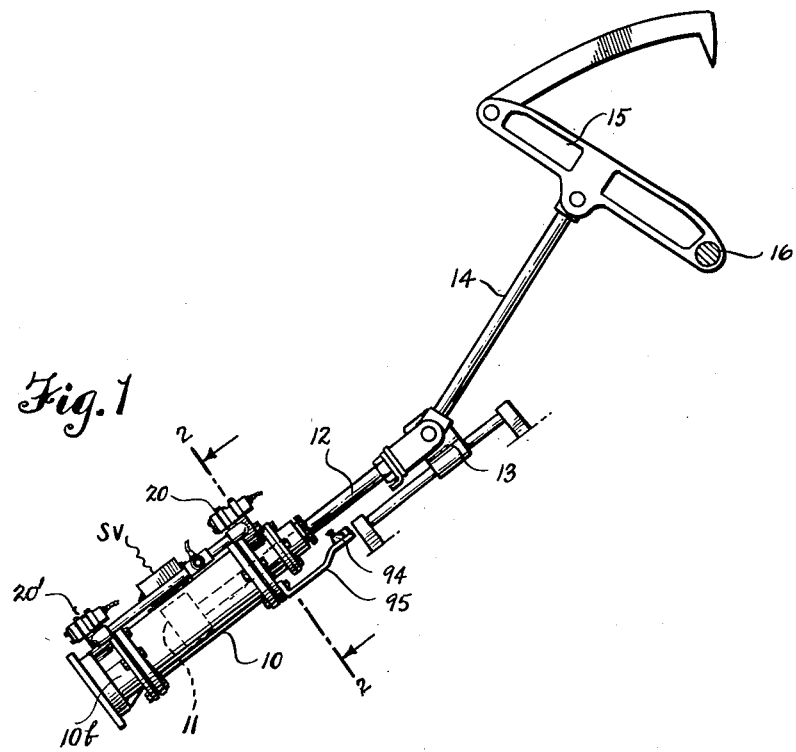
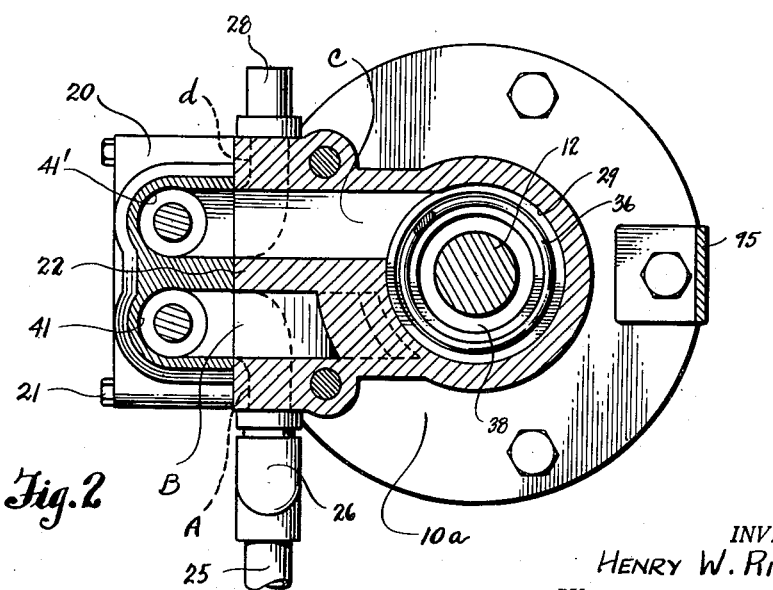

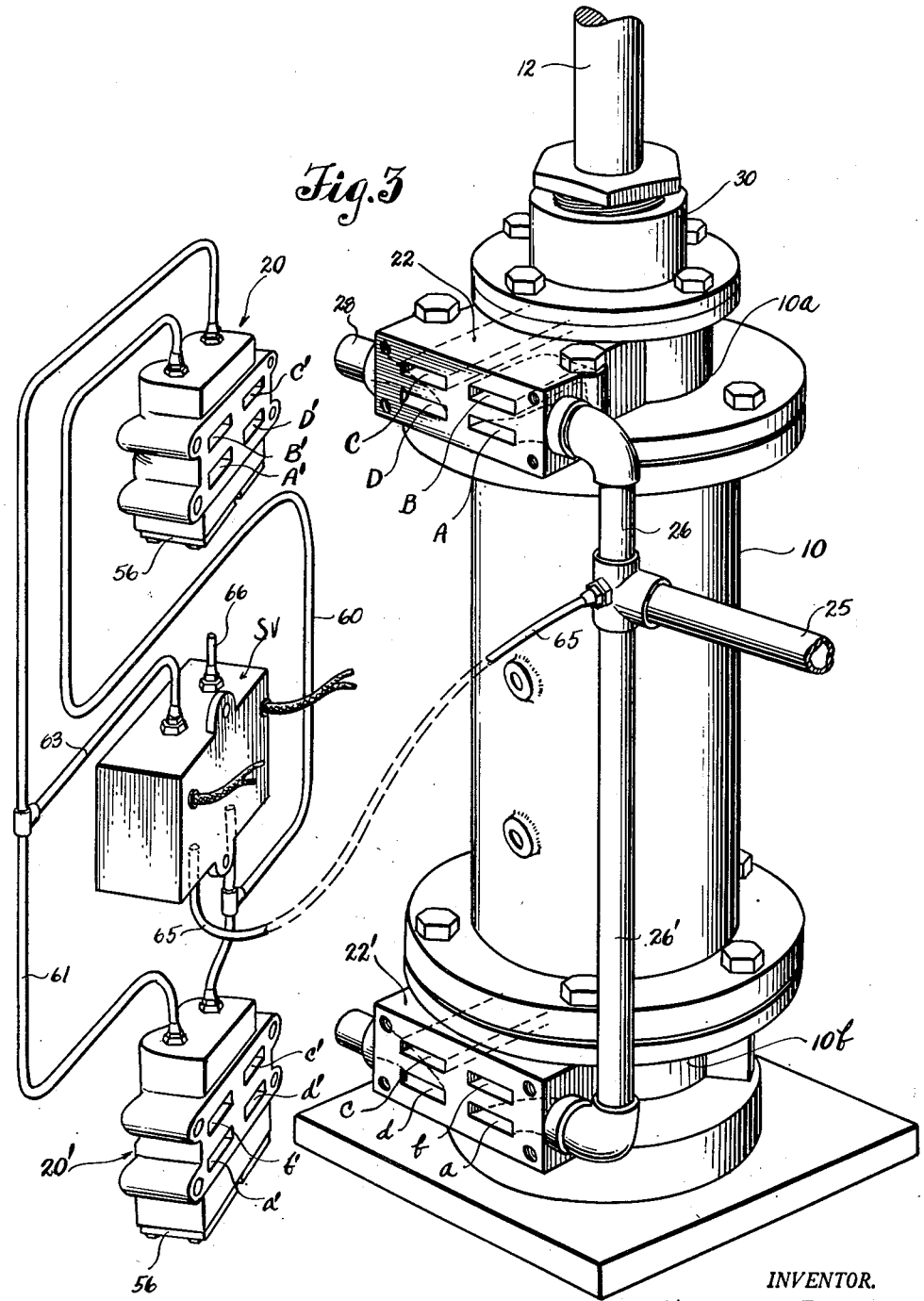

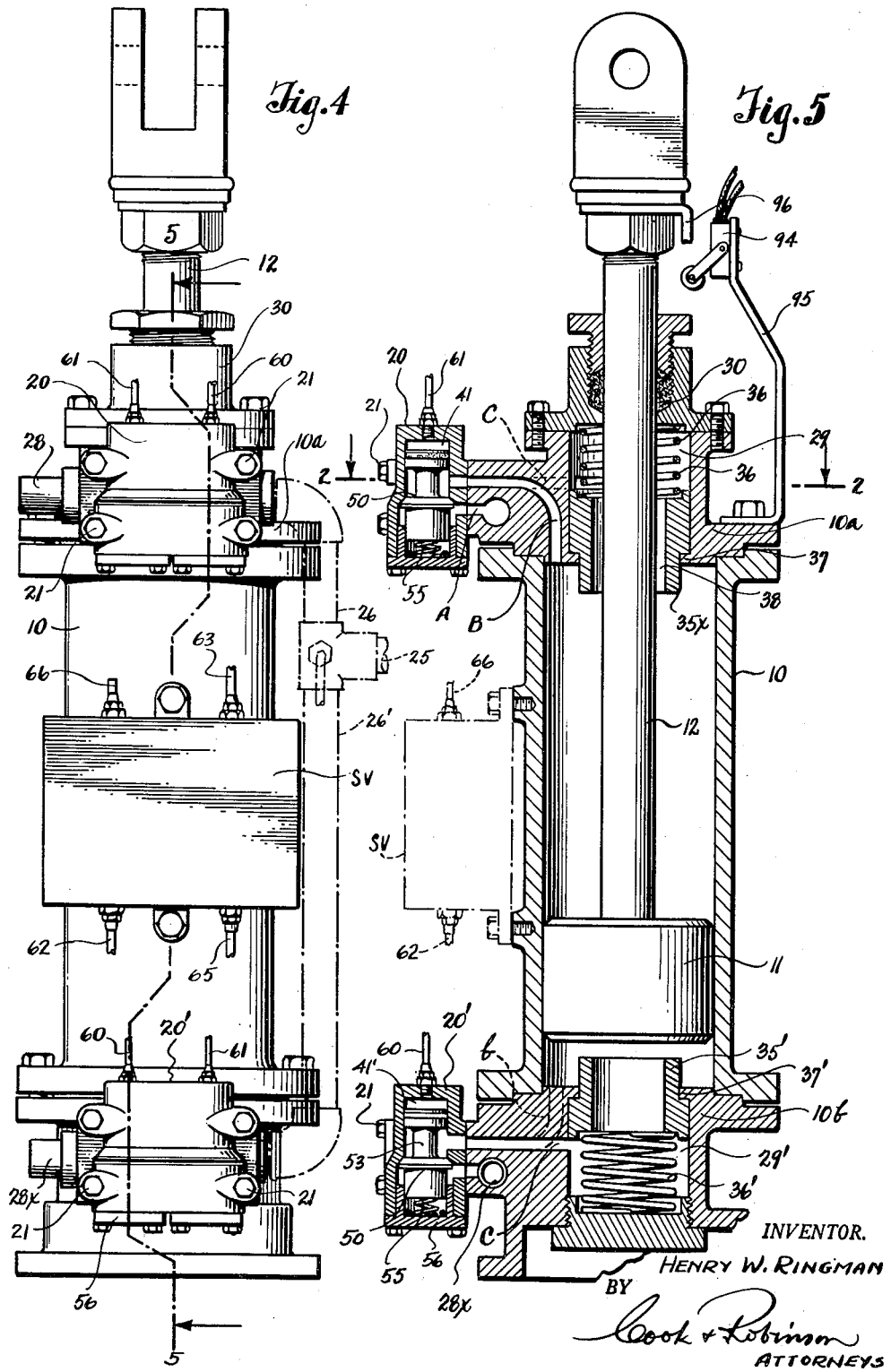

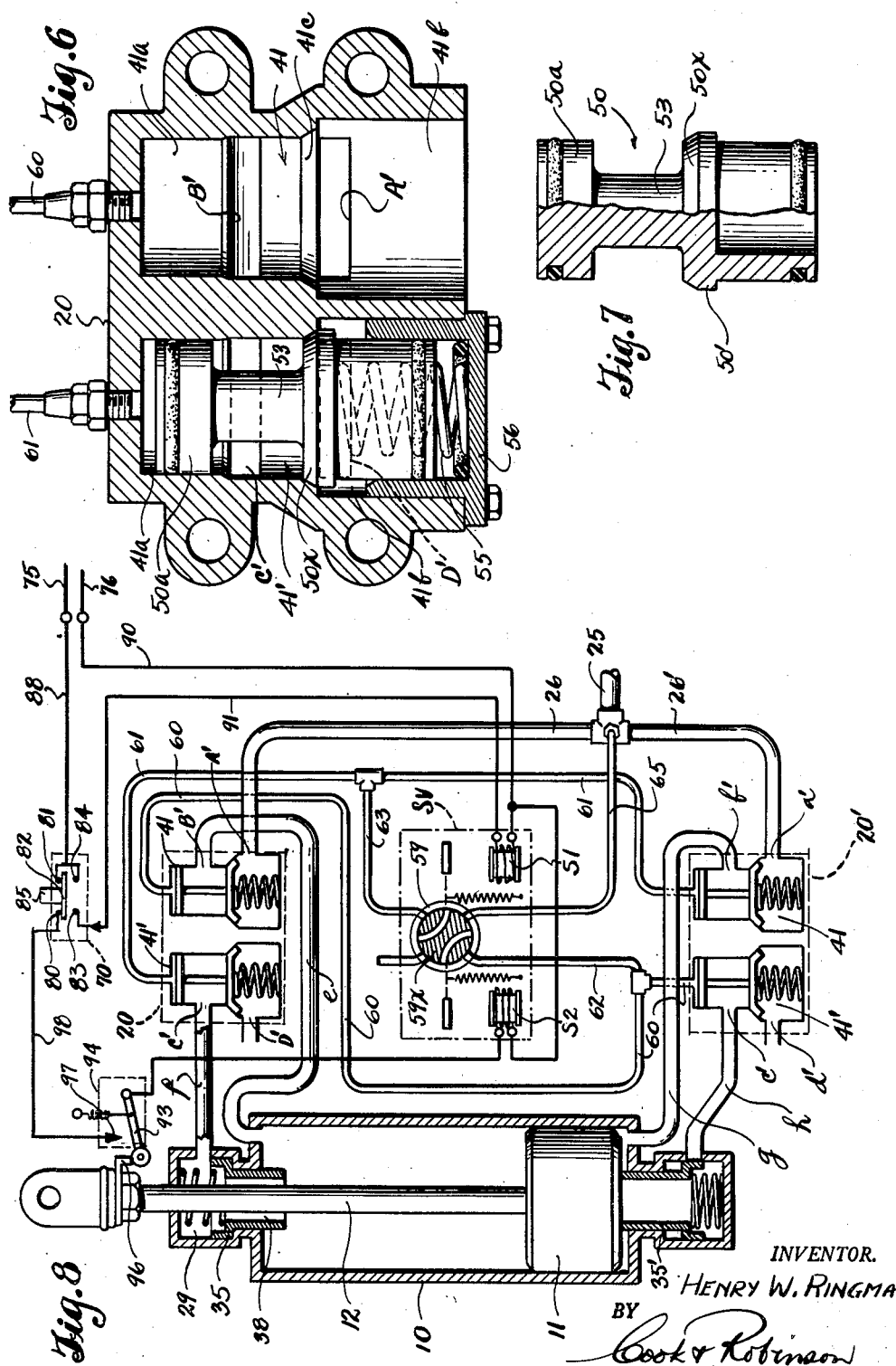

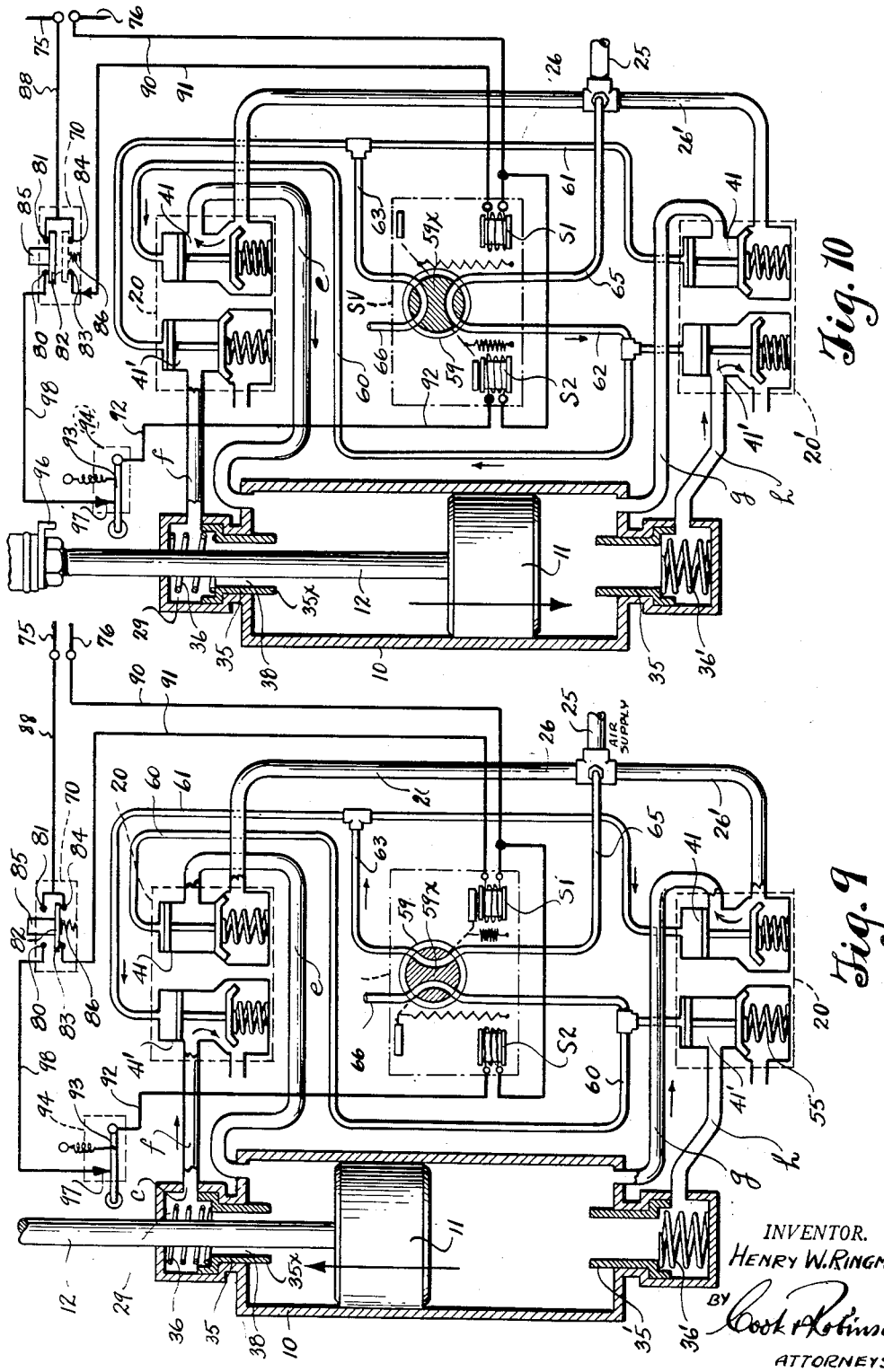

2,778,342

POPPET TYPE VALVE DISTRIBUTING SYSTEM FOR A SERVO-MOTOR

Henry W. Ringman, Everett, Wash., assignor to Sumner Iron Works, Inc., Everett, Wash., a corporation of Washington Application August 10, 1953, Serial No. 373,288

5 Claims. (Cl. 121—38)

This invention relates to power cylinders and controls therefor. More particularly, it has reference to improvements in power cylinders designed for use in connection with heavy equipment such as, for example, log turners, skid lifts and the like as used in sawmill operations; it being understood, however, that the invention is not to be limited to use with any specific type of mechanism.

It is the principal object of this invention to provide a power cylinder with a control mechanism therefor which provides for the admittance to and exhaustion of the employed fluid pressure medium from the cylinder under push button control.

It is a further object of the invention to provide a simplified control mechanism for the power cylinder comprising a four way solenoid valve that is operable electrically and under push button control for the admittance of the fluid pressure medium to and from opposite ends of the power cylinder, thus making possible the control of the cylinder from points that may be near or remote therefrom.

It is also an object of the present invention to provide a power cylinder and a control mechanism therefor that does not have the usual exposed, moving parts; that is relatively simple in construction; that is operable under control of a four-way solenoid valve with push button control and which control provides that depression of the single control button results in the power piston being actuated in one direction and release of pressure against the depressed button results in the reversal of the valve and an incident movement of the piston in the opposite direction.

A further object of the invention resides in the provision of novel and practical means for effecting the cushioning of the reciprocal movements of the piston and its rod.

Still further objects and advantages of the invention reside in the details of construction and combination of parts and in the mode of operation of the mechanism, as will hereinafter be fully described.

In accomplishing these and other objects of the invention, I have provided the improved details of construction, the preferred forms of which are illustrated in the accompanying drawings, wherein:

Fig. 1 is a side view of a power cylinder and control mechanism embodied by the present invention, as applied to a log turner.

Fig. 2 is an enlarged cross-sectional view of a head of the cylinder, as seen on line 2—2 in Fig. 1 and in Fig. 5.

Fig. 3 is a perspective view of the power cylinder with control valve housings dismounted therefrom for explanatory purposes, and adjusted to positions showing the air passages opening through their back surfaces.

Fig. 4 is an elevation showing the power cylinder with the valve housings applied thereto.

Fig. 5 is a longitudinal section of the power cylinder taken substantially on line 5—5 in Fig. 4.

Fig. 6 is an enlarged cross-sectional view of one of the poppet valve housings, showing one of the valves as normally contained therein and the other valve removed.

Fig. 7 is a side view of one of the poppet valves, shown partly in longitudinal section.

Fig. 8 is a diagrammatic showing of the closed position of the four poppet valves when the solenoid valve is de-energized and closed.

Fig. 9 is a diagrammatic showing of the present mechanism indicating the position of the poppet valves for an outward actuation of the piston rod from the power cylinder.

Fig. 10 is a similar view showing the positioning of the poppet valves for an inward actuation of the piston rod.

Referring more in detail to the drawings:

First, giving consideration to the device as seen in Fig. 1: In this view, I have illustrated the power cylinder and control mechanism embodied by this invention, as applied for use in the operation of parts as used in conjunction with a log turner; this being only one of many different mechanisms with which the present power cylinder can be functionally employed. The power cylinder is designated in its entirety by reference numeral 10 and it has a piston 11 recprocally contained therein, as best shown in Fig. 5, and a rod 12 is fixed to the piston and extends from one end of the cylinder. As shown in Fig. 1, the rod 12 is operatively connected at its outer end, through the mediacy of a slide 13 and link 14, with an arm 15 that is fixed to and extends radially from the rotatably mounted operating shaft 16 of a log turner. In this application, the power cylinder operates to actuate the lever 15 and shaft 16 for log turning purposes as is well understood by those familiar with saw mill machinery.

The power cylinder 10 in this instance is of the double acting type and the cylinder body is shown, more particularly in Figs. 2 and 4, to be fitted with and closed at its upper and lower ends respectively, by cylinder heads 10a and 10b and these are formed, as presently described, with inlet and exhaust ports.

Associated with the exhaust and inlet ports at the upper and the lower ends of the cylinder, respectively, are housings 20 and 20' containing poppet valves that are operable by a solenoid valve mechanism for controlling the admittance to and exhaustion from the cylinder, of the employed pressure medium. These valve housings 20 and 20' are shown in Fig. 4 to be secured in position to the cylinder heads by bolts 21.

For the admittance of the employed fluid pressure medium into and from the cylinder, inflow and exhaust passages are provided in the upper and lower cylinder heads 10a and 10b, as has been shown in Figs. 3 and 5. It is shown best in Fig. 3 that mounting bosses 22 and 22' for the valve housings are cast integrally with the cylinder heads and extend laterally therefrom. Opening to the flat vertical face of each boss, 22 and 22', are four passages; their outer ends being located at the four corners of a rectangular surface area. The four passages opening through the face of the upper boss 22 are designated, respectively, and best seen in Fig. 3, by reference characters A, B, C and D. The correspondingly located passages opening through the face of the lower boss 22' are designated, respectively, by reference characters $a$, $b$, $c$ and $d$.

The operating fluid pressure medium, which may be steam or air under pressure, but which for convenience will hereinafter be referred to as air, is brought under pressure to the power cylinder from a source of supply, not shown, through a supply pipe 25 from which branch pipes 26 and 26' lead, respectively, to upper and lower ends of the cylinder. The pipe 26 connects through a side wall surface of the boss 22 directly with the passage A therein. The pipe 26', likewise, connects through a side wall of the boss 22' with the passage a therein.

The passage B that is formed in the boss 22, at the upper end of the cylinder, leads inwardly from the face of the boss as well shown in Fig. 5, thence turns downwardly and opens through the inner face of the cylinder head 10a into the upper end of the cylinder chamber. Passage D opens through a side wall of the boss 22 to an exhaust pipe 28, and passage C leads inwardly into the cylinder head, as shown in dotted lines in Fig. 5, and also seen in Fig. 2, and opens into the upper portion of a cylindrical spring chamber 29 that is formed in the cylinder head 10a along and coaxial of the piston rod as extended upwardly through the cylinder head; the chamber 29 having direct communication at its lower end with the power cylinder chamber and being closed at its upper end by a stuffing box 30 through which the piston rod is reciprocally extended.

Reciprocally fitted in the spring chamber 29, as seen in Fig. 5, is a sleeve valve 35. This is continuously urged downwardly by a coiled spring 36, that is located in the upper end portion of chamber 29, and it is positively limited in its downward movement by a stop flange 37 that is formed at the lower end of the chamber 29. The sleeve 35 has substantial clearance about the piston rod 12 and thus provides a passage 38 for the easy outflow of exhaust air from the cylinder chamber into the spring chamber 29 and thence to the exhaust pasasge C.

It is to be noted in Fig. 5 that the sleeve valve 35 has a diametrically reduced lower end portion 35x that projects downwardly beyond the lower face of the cylinder head and into the cylinder chamber. Normally, the spring 36 holds the valve sleeve in its Fig. 5 position at which it is below the level of exhaust passage C. However, when the piston 11 is moved to its upper limit of travel in cylinder 10, it engages the lower end of this sleeve valve and shifts it upwardly, thus causing the upper end portion thereof to close over the entrance to exhaust passage C and cut off the further exhaustion of air from that end of the cylinder. Thus, a quantity of air is trapped to cushion the pistons stop.

The arrangement of passages at the lower end of the cylinder 10 is as follows: The passage a connects directly through a side wall of the boss 22' with the air supply pipe 26' as previously stated. The passage b leads inwardly, thence turns upwardly and opens through the inner face of the cylinder head 10b as shown in dotted lines in Fig. 5, into the lower end of the power cylinder chamber. The passage d opens through a side wall of the boss 22' to an exhaust pipe 28x. The passage c leads directly inwardly into the cylinder head 10b, as shown in Fig. 5, and opens into a cylindrical spring chamber 29' in the lower cylinder head. This chamber reciprocally contains a sleeve valve 35' therein which is like and serves a purpose like that of the sleeve valve 35 at the upper end of the cylinder. This sleeve valve 35' is urged upwardly against a stop flange 37' by a coiled spring 36' and when its upper end, which extends upwardly from the inner face of the lower cylinder head, is engaged by the piston 11 in its downward travel, it is depressed and the valve body is thus caused to cover the inner end of passage c thus to trap air and provide an air cushion for the downwardly driven piston.

Fixed upon the bosses 22 and 22' respectively, by the bolts 21, are the previously mentioned box-like poppet valve housings 20—20', each being like the other in construction and mode of application to the cylinder. Each housing is formed with two parallel and vertically directed valve chambers 41 and 41' as seen in Fig. 6; each chamber having an upper end portion 41a of one diameter, a lower end portion 41b of slightly larger diameter, and a conical valve seat 41c joining and intermediate the parts of unequal diameter.

Opening from each of the valve chambers 41 and 41' and through the rear surface of the containing housing as best shown in Fig. 3, are two air passages as follows: Passages A', B' that open from the chamber 41 of the upper valve housing 20 into direct communication, respectively, with the passages A and B of the boss 22 on the cylinder block, and passages C' and D' that, likewise, open from valve chamber 41' of the upper housing into direct communication, respectively, with passages C and D of the cylinder block. Likewise, in the lower housing 20', are passages a' and b' that open from the chamber 41 of that housing into direct communication with the passages a and b of the lower end of the cylinder block, and passages c' and d' that open into direct communication with the passages c and d at that end of the cylinder block.

It is further to be noted, as shown diagrammatically in Fig. 8, that the passages B' and C' of the upper housing 20 and the passages b' and c' of the lower housing 20' open into the poppet valve chambers above their conical seats, while the passages A' and D' and a' and d' open into the housing chambers below the conical seats thereof; this being for a purpose presently understood.

Reciprocally fitted in the valve chambers 41—41' of the two housings 20 and 20' are poppet valves 50 of the kind shown in Fig. 7. Each poppet valve has a cylindrical lower end portion 50' formed at its upper end with an encircling, conical flange 50x designed to close against the corresponding conical seat, and has a cylindrical upper end piston-like portion 50a joined with the lower end portion by a connecting stem 53 of reduced diameter. A coiled spring 55 enclosed in the lower end portion of each chamber and held in place by a closure cap 56 urges the poppet valve upwardly. When a poppet valve is caused to be depressed and the conical flange unseated, the air passages that open into that valve chamber, above and below the seat 41c are brought into communication. When the valve is moved to its closed position, communication is cut off.

For the purpose of controlling the opening and closing movements of the poppet valves 50 of both housings 20 and 20', I have provided for application and exhaustion of air under pressure into and from the upper ends of the valve chambers 41-41' by means which has been shown in Figs. 2, 8, 9 and 10; the application of air being through the mediacy of and is controlled by a four-way solenoid valve mechanism which is herein shown rather diagrammatically and is designated in its entirety by reference characters SV.

In order that the action of the four poppet valves 50 will be affected in proper manner to attain the results desired, the valve chambers 41—41' of the upper housing 20 are interconnected with chambers 41—41' of the lower housing 20' as best shown in Figs. 3 and 8 to 10 inclusive, wherein it is observed that the upper end of the valve chamber 41 of the upper housing 20 and the upper end of the valve chamber 41' of the lower housing 20' are joined by an air pipe 60. Likewise, the upper end of the chamber 41' of valve housing 20 and the upper end of the chamber 41 of the housing 20' are joined by an air pipe 61. Pipes 60 and 61 are connected, respectively, by pipes 62 and 63 with opposite ports of the housing 59 of a four-way solenoid operated valve as presently explained. Air under pressure is brought to the valve housing from pipe 26 through a pipe line designated at 65. Air is exhausted from the valve housing through a pipe 66.

The rotatable plug member of the four way valve is designated by numeral 59x, and it is actuated between its extreme positions by a pair of solenoids S1 and S2 which are diagrammatically shown in Figs. 8, 9 and 10. The energization of solenoid S1 moves the valve plug 59x to the position of Fig. 9. Likewise, energization of solenoid S2 causes the valve plug to be rotated to the reverse position, of Fig. 10. Fig. 8 shows the valve plug in a neutral position which it assumes under spring action when neither solenoid is energized.

The control circuit for the solenoid valve mechanism has been shown diagrammatically in Figs. 8, 9 and 10 wherein 75 and 76 designate power lines leading to the mechanism. The application of electrical energy is through a push button switch designated by numeral 70 equipped with contacts 80 and 81 adapted to be electrically connected by the switch bar 82 when it is in one of its positions, and contacts 83 and 84 adapted to be joined by the switch bar when depressed to its other position; the switch bar 82 is equipped with push button 85 and a spring 86 operates to yieldingly hold it in a raised position engaged with and electrically connecting the contacts 80 and 81. A circuit wire 88 leads from line 75 to the contacts 81 and 84; a wire 90 leads from supply line 76 and has connection with one pole of each of the solenoids S1 and S2; a wire 91 joins contact 83 with the other pole of solenoid S1 and a wire 92 leads from the other pole of the solenoid S2 to a switch lever 93 of a limit switch 94; this latter switch being supported from the power cylinder as shown in Fig. 5 by a bracket 95 so that a switch lever actuator 96 that is fixed to the outer end portion of piston rod 12 will engage lever 93 and actuate it to open the limit switch when the piston 11 is actuated to its inner limit. When the limit switch is thus opened, the lever 93 is caused to be disengaged from the switch contact 97 to which a circuit wire 98 leads from the push button contact 80.

When the piston is at its inner limit of travel the limit switch is held open, as seen in Fig. 8, and the circuits through the solenoids will be opened and both solenoids deenergized. The valve plug element will then be spring actuated to the neutral position of Fig. 8.

It will here be stated, merely as explanatory to the diagrammatic showing of parts in Figs. 8, 9 and 10 that the passages B and C of the upper cylinder head are represented by the pipe lines *e* and *f*, and the passages *b* and *c* of the lower cylinder head are represented by pipe lines *g* and *h*.

Assuming that the mechanism is at rest and the switches 70 and 94 in positions indicated by the showing in Fig. 8, with the piston 11 in a retracted or lowered position, should it be desired to actuate the rod and piston outwardly, the operator depresses the push button 85. This causes the contractor bar 82 to electrically join the switch contacts 83 and 84, as in Fig. 9. This results in solenoid S1 being energized and the valve plug rotated to a position at which one of the passages therein connects air supply line 65 with line 63 leading to air line 61 which latter opens at its ends, respectively, to the upper ends of valve chambers 41' and 41 of the two housings 20 and 20'. The admittance of air to these two chambers depresses the poppet valves contained therein to their open positions and through the chamber of the lower housing 20 opens the air inlet passages to the lower end of the power cylinder, and through the chamber of the upper housing opens the exhaust passage for exhaustion of air from the upper end of the power cylinder. When the piston almost reaches its upper limit of travel it engages and actuates the sleeve valve 35 upwardly, as previously described, to close the exhaust passage C and trap air in the upper end of the power cylinder that provides an air cushion whereby the piston is stopped without detrimental jar. The piston will be held extended as long as the push button is held depressed.

When the operator releases holding pressure from the depressed push button, the contactor 82 is actuated upwardly against the two contacts 80 and 81 as in Fig. 10, thus closing the energizing circuit to solenoid 82. This solenoid then operates to rotate the valve plug 59*x* to position of Fig. 10, thus effecting the connection of air line 65 with air line 62, and the connection of air line 63 with exhaust pipe 66. Air under pressure admitted through the valve to line 62, is delivered through pipe line 60 to the upper ends of poppet valve chambers 41 and 41' of the housings 20 and 20', thus providing for admittance of air under pressure from the supply line 26 into the upper end of the power cylinder to drive the piston 11 downwardly, and to open the exhaust passage from the lower end of the power cylinder past the open poppet valve in housing 20'. As the downwardly traveling piston nears the lower limit of its travel, it engages the sleeve valve 35' and causes it to be closed over the exhaust passage *d* and traps air to form an air cushion. As the piston reaches its lower limit of travel, the limit switch actuator 96 engages the actuating lever of the limit switch 94 and moves it to the open position of Fig. 8. This opening of the limit switch opens the circuit through the solenoid 82 and the solenoid valve again is returned to a neutral position and the piston and its rod remains in retracted position.

Having thus described my invention, what I claim as new therein and desire to secure by Letters Patent is:

1. A double acting power device for use in combination with a source of supply of fluid pressure medium and a mechanism to be actuated, said device comprising a power cylinder, a piston reciprocally fitted in the cylinder and having a piston rod extended therefrom for connection with the said mechanism to be actuated, said cylinder having at least one inlet port and one exhaust port at one end thereof, a valve mechanism interconnected with the cylinder and said valve mechanism including two valve chambers, one of said chambers being connected, respectively, with the source of supply of pressure medium and the cylinder inlet port, and the other chamber having an atmospheric exhaust connection and a connection with the cylinder exhaust port, valves contained in the respective chambers, each valve being movable between an open position, providing direct communication between the two connections respectively that open to its chamber and a closed position at which valves close the communication between their respective connections, spring means normally urging the valves to their closed positions, a control valve connected with the source of pressure medium and having connections leading therefrom to each of the valve chambers for the admission of pressure medium thereto to actuate the valves, a sleeve valve in the end of the cylinder adjacent the exhaust port operable to close the exhaust port, spring means acting against said sleeve valve to urge it to open position, and means on the sleeve valve providing for its actuation to closed position by the piston as it approaches its limit of travel toward the valve.

2. A double acting power device for use in combination with a source of supply of fluid pressure medium and a mechanism to be actuated, said device comprising a power cylinder, a piston reciprocally fitted in the cylinder, a piston rod extended from the piston and connected with the said mechanism to be actuated, said cylinder having an inlet port and an exhaust port at each of its opposite ends, a valve housing interconnected with each end of the cylinder, each valve housing having two valve chambers therein, one chamber of each valve housing connected, respectively, with the source of supply of pressure medium and with the inlet port at that end of the cylinder, the other chamber of each housing having an atmospheric exhaust connection and a connection with an exhaust port of the cylinder, valves contained in each of the chambers, each valve being movable between an open position providing direct communication between the two connections that open to its chamber and a closed position at which the valve closes communication between the connections, spring means normally urging the valves to their closed positions, a control valve connected with the source of pressure medium and having connections leading therefrom to each of the valve chambers for the admission of pressure medium thereto to actuate the contained valve to its open position, said control valve being movable to one of two positions to effect the opening of the inlet passage at one end of the cylinder to admit pressure medium to the cylinder at that end and to open the exhaust passage at the other end, and said control valve being movable to the other position to admit pressure medium to cause actuation of the other valves to open position and the release of holding pressure medium from the first actuated valves to permit their closing, a sleeve valve in each end of the cylinder operable to open and close the exhaust port at that end, spring means acting against each of said sleeve valves to urge each valve to its open position, and means on each sleeve valve providing for its actuation to closed position by the piston as the piston approaches its limit of travel toward the end of the cylinder.

3. A mechanism as recited in claim 2 wherein each sleeve valve is reciprocally fitted in the end heads of the power cylinder and is movable in the axial direction of the cylinder between positions that open and close the exhaust ports, means for limiting the opening movements, springs acting against the sleeves to urge them to open positions, said sleeve valves extending into the power cylinder for actuation to closed position by the piston during the final travel in opposite directions.

4. A structure as recited in claim 2 wherein solenoids are provided for the actuation of the control valve from one position of control to the other, a circuit for the solenoids and a manual control switch for the circuit.

5. A structure as recited in claim 2 wherein the valve chambers of said valve housings have opposite end portions into which the two connections for each chamber open, respectively, and a valve seat is formed between said end portions, and wherein the valve of each of said chambers comprises a piston portion, against which pressure medium is applied under control of the said control valve to open the valve, away from said seat thus to connect the passages.

References Cited in the file of this patent

UNITED STATES PATENTS

| | | |
|---|---|---|
| 296,206 | Heermans | Jan. 15, 1889 |
| 651,550 | Kron | June 12, 1900 |
| 814,275 | Collier | Mar. 6, 1906 |
| 1,147,820 | Scott | July 27, 1915 |
| 1,833,216 | Hanna | Nov. 24, 1931 |
| 1,852,507 | Davis | Apr. 5, 1932 |
| 2,451,013 | Ziskal et al. | Oct. 12, 1948 |
| 2,471,320 | Gilson | May 24, 1949 |
| 2,556,698 | Loewe | June 12, 1951 |
| 2,567,073 | Kupiec | Sept. 4, 1951 |
| 2,569,881 | Davies | Oct. 2, 1951 |
| 2,583,185 | McLeod | Jan. 22, 1952 |
| 2,672,731 | Ashton | Mar. 23, 1954 |